United States Patent [19]

Van Den Hul

[11] 4,365,325

[45] Dec. 21, 1982

[54] STYLUS FOR TRACKING A STEREOPHONIC OR QUADRAPHONIC SOUND GROOVE

[76] Inventor: Aalt-Jouk Van Den Hul, Hertog-Govertkade 10, Delft, Netherlands

[21] Appl. No.: 268,436

[22] Filed: May 29, 1981

Related U.S. Application Data

[60] Division of Ser. No. 41,666, May 23, 1979, abandoned, which is a continuation-in-part of Ser. No. 818,903, Jul. 25, 1977, abandoned.

[30] Foreign Application Priority Data

Aug. 27, 1976 [CH] Switzerland ..................... 010938/76
Mar. 23, 1977 [CH] Switzerland ..................... 003852/77

[51] Int. Cl.³ .............................................. G11B 3/44
[52] U.S. Cl. .................................................. 369/173
[58] Field of Search ......................................... 369/173

[56] References Cited

U.S. PATENT DOCUMENTS

| | | | |
|---|---|---|---|
| 2,544,495 | 3/1951 | Franz | 369/173 |
| 3,534,968 | 10/1970 | Puleston | 369/173 |
| 3,871,664 | 3/1975 | Hughes | 369/173 |
| 4,105,212 | 8/1978 | Ogura | 369/173 |

*Primary Examiner*—Steven L. Stephan
*Attorney, Agent, or Firm*—William A. Drucker

[57] ABSTRACT

A stylus for tracking a stereophonic or quadraphonic sound groove that consists of a mounting part and a taper. The tracking edges of the taper is V-shaped and has a rounded tip. The two ground sections which form this edge are symmetrical and run convex for optimum playback.

6 Claims, 8 Drawing Figures

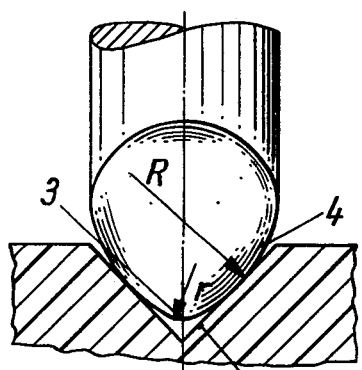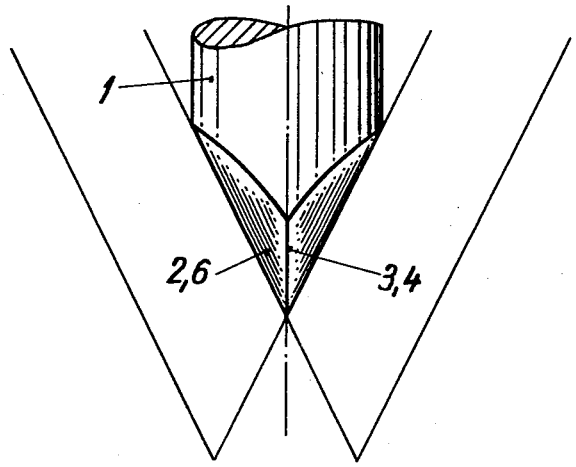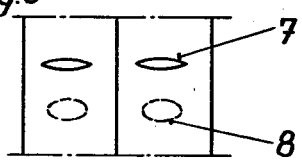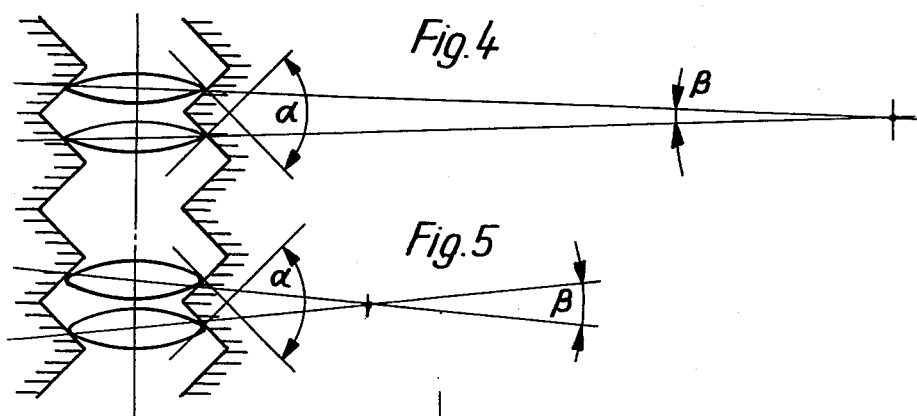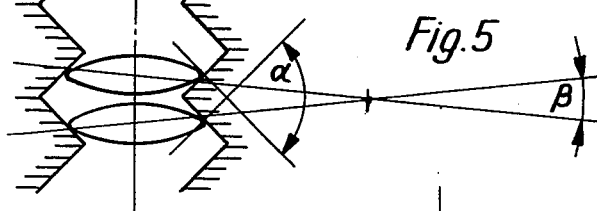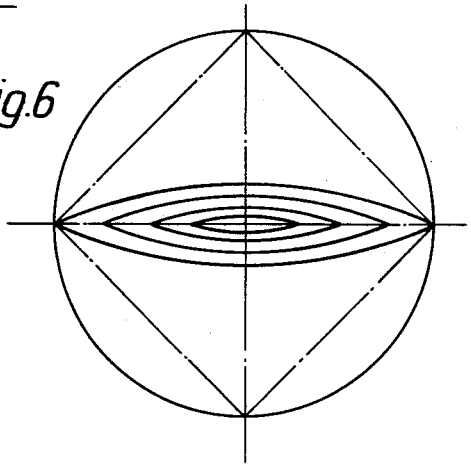

STYLUS FOR TRACKING A STEREOPHONIC OR QUADRAPHONIC SOUND GROOVE

CROSS-REFERENCE TO RELATED APPLICATION

This is a divisional of Ser. No. 41,666, filed May 23, 1979 now abandoned, which was a continuation-in-part of application 818,903, filed July 25, 1977, now abandoned.

BACKGROUND OF THE INVENTION

1. Field of the Invention

The invention relates to a stylus for tracking a stereophonic and/or quadraphonic sound groove of a record, the stylus consisting of a mounting portion and a taper.

2. Prior Art

Pick up styli with a point shaped like a circular cone with rounded vertex have been known for a considerable time. A drawback in their use has been the fact that the stylus touches the two walls of the v-shaped sound groove of a record at near circular surfaces, resulting in only partial use of the groove wall in the region of the groove wall which lies in a plane perpendicular to the groove of the record. At the same time, with regard to the direction of motion of the record, the stylus touches a relatively large surface of the groove compared with the wave length of the high frequencies (i.e. up to 20 kilohertz). Since the cutter for cutting the sound grooves of the record has sharp edges, (i.e. the smallest possible radii of curvature of about 3 microns) the stylus with its relatively large radii of curvature can not accurately pick up the high frequencies recorded in the record grooves. Additional undesirable effects, such as squeezing of the stylus, binding, emphasis and de-emphasis with double frequency to lateral deflection were very unfavorable for stereo reproduction systems using 45°-45° recording.

In view of the above, a diamond tip stylus was suggested with a taper shaped like a chisel, the two opposing facets forming a chisel-like edge about 35 microns wide. This chisel-like edge is placed at right angles to the longitudinal direction of the sound groove. Considering the direction of motion, the area of contact with the sound groove is very small, making for better playback of high frequencies, but also permanently deforming the record and modifying the original groove-wall-displacements. Bringing the main axis of the rough diamond into line with the longitudinal axis of the stylus increases firmness of the stylus. The pick up stylus is mounted on the cantilever in such a way that the chisel-like edge is perpendicular to the longitudinal direction of the cantilever. Yet, the fact that the two walls of the sound groove of the record were only partially tracked, still resulted in unsatisfactory performance.

To eliminate this drawback, a pickup stylus was developed wherein the cross sections over the length of its taper have the form of ellipses of decreasing size, the curves at the ends of the major axis of the ellipses along at least the active part of the taper having at least approximately equal radii or curvature and the rounding of the free end of the taper, looking in the direction of the minor axis of the ellipses, having a radius of curvature greater than the mentioned approximately equal radi of curvature. Yet, sound reproduction proved to be modestly satisfactory only at low and mid-pickup frequencies.

Consequently, a stylus was developed whose taper has ground sections on two opposing sides so that their edges de-limit narrow facets which partially touch the walls of the sound groove, each pair of such adjoining edges, at least in the area of contact, running approximately parallel to each other, with the result that two tangents drawn along the edges in the area of contact run parallel to each other. The ground sections each consist of two plane facets with an obtuse angle (about 120°) between them, the dihedral angles lying in the plane determined by the transit direction of the stylus axis. These styli result in narrow, relatively short contact areas with the two groove walls of the record.

In general, undistored playback is insured only if the contact areas of the stylus tip edges are very narrow, permitting the stylus to rapidly follow sudden changes in the groove of the record when tracking a recording. In the case of high frequency recordings, however, such a narrow shape of the stylus tip is insufficient for undistored playback because the movement of the stylus causes variation of the tracking weight on the disc groove with accompanying plastic deformation.

To eliminate this drawback, a pickup stylus was designed with a coniform taper, of which two ground sections with an obtuse angle (120°) between them together form an edge. The vertex of the cone lies in the part to be removed and the intersecting lines of the ground sections cut the axis of the cone at an angle of less than 90°. This angle as well as the dihedral angle of the ground sections are so chosen that those parts of the stylus in contact with the sound groove lie on a plane normal to the groove.

It has now been determined by the applicant herein that the desirable shape for a stylus is one which is capable of tracking a maximum distance along a line which lies on the groove and is in the plane perpendicular to the axis of the groove. It has also been found that the stylus should track over a minimum distance in the direction of groove movement. One prior art stylus which partially solved this problem is the Shibata-type of stylus and this stylus did not solve the problem for other reasons. All of the prior art styli, aside from the shibata-type, do not have a proper radius of curvature, such radius of curvature being either too large or too small, that is, too large in the front-back direction and too small in the vertical direction.

In order to reproduce a maximum of high frequency signals, the prior art styli as described above, utilized an excessive weight to artifically force the styli into the high frequency portions of the grooves, these being the smaller modulation regions. While this increased the high frequency response, this excess weight also tended to damage the records by providing a permanent deformation in the grooves as well as by scraping out portions of the record surface. This was all due to the fact that the prior art styli did not conform optimally to the shape of the groove walls.

SUMMARY OF THE INVENTION

In accordance with the present invention, the stylus is designed to conform very closely to the shape of the cutter and groove walls so that it can track the small high frequency modulations without requiring excess weight for this purpose. For this reason, the styli produced in accordance with the present invention can provide increased high frequency response relative to the prior art styli with a great reduction in the required tracking pressure. About two-thirds to one-half of the tracking pressure of prior art styli is required. Even one-fourth of normal tracking pressure will work sometimes, especially with high compliant stylus. This provides a great savings in both record wear and stylus wear. In addition, the stylus of the present invention provides a great decrease in harmonic distortion, especially in the high frequency range. Independent tests have shown that the present stylus exhibits about 0.6% harmonic distortion whereas the best prior styli exhibit about 2.5% harmonic distortion.

The stylus in accordance with the present invention is formed by shaping a diamond so that the taper is formed from two curved and intersecting planes, the planes being symmetrical about the edge formed and the edge being slightly rounded. The desire is to have a minimum distance between curved planes in the non-intersecting regions to reduce stylus mass. The stylus is designed to have a beta ($\beta$) as described hereinbelow of 60° or less.

DESCRIPTION OF THE DRAWINGS

The appended drawings show, by way of example, two embodiments of the stylus as well as the conditions of contact in the sound groove. Shown are:

FIG. 1 shows the stylus in contact with the sound groove on an enlarged scale, looking in the direction of the latter;

FIG. 2 a profile view of FIG. 1 with indication of the coniform ground sections;

FIG. 3 the achievable narrow and long contact areas and, dash-dotted for comparison, the relatively wide and short contact areas achieved with an elliptical taper, FIG. 4 angle $\beta$ as formed by the lines connecting the points of contact of the tracking stylus, and for comparison;

FIG. 5 angle $\beta$ in the case of an elliptical taper;

FIG. 6 the stylus as shown in FIG. 1 seen from below on a highly magnified scale;

DESCRIPTION OF PREFERRED EMBODIMENTS

Figure 7:
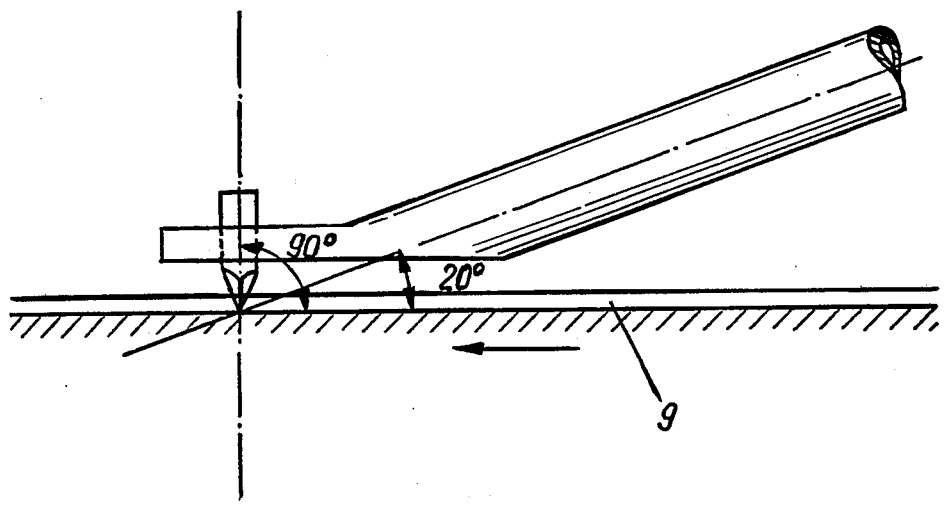
FIG. 7 a mounting of the stylus as shown in FIGS. 1 and 2 to the tone-arm in the conventional way, on a magnified scale.

The stylus shown in FIGS. 1 and 2 is intended for tracking a stereophonic and/or quadraphonic v-shaped groove. It consists of a mounting portion 1 which can have a square, round or other cross sectional shape and a tapered portion 2. The tapered edge is formed from two curved intersecting planes which intersect at the edge 3, 4. The edge 3,4 is a continuous curved line. The radius of curvature (R) (FIG. 1) of this curved line in the region where the stylus touches the groove of a record is from about 80 to 100 microns. As can be seen from FIGS. 1 and 2, the taper is formed by two curved planes which intersect each other along the line 3, 4 as mentioned above. The edge 3, 4 is polished and this removes the sharp tip and provides a small amount of curvature at the edge. This curvature has a radius (r) which is on the order of 4 to 10 microns and preferably 6 microns. The purpose of utilizing the radius of curvature R from about 80 to 100 microns is so that the edge 3, 4 of the stylus will contact at least 80% of the possible distance of a line which lies in a plane perpendicular to the groove of the record and along the groove side as mentioned above in a normal modulated groove. It is known that a standard groove has a normal distance of about 50 microns across at its top. The distance between the non-contacting portions of the two planes is minimized in order to reduce stylus mass. It should be understood that this distance is not critical, however, the lower the stylus mass, the lower will be the reacting force of the groove walls. The intersection angle of the two planes and small r as shown in FIGS. 1 and 2 should be constant over the entire range which would contact the record groove and preferably over a greater distance. In practice, these constant values extend over a distance much greater than that portion of the stylus which fits within the groove.

The contact areas 7 with the two sides of the V-shaped sound grooves (FIG. 3) are narrow and long compared to the contact areas 8 of an elliptical stylus. The angle beta ($\beta$) of the lines joining two opposing contact points of the stylus with the sound groove is very small (FIG. 4) compared to the angle beta of an elliptical stylus (FIG. 5). As shown in FIGS. 4 and 5, when the stylus tracks in the groove, the two points where the groove touches the stylus move around the stylus tip over a small angle. This is the angle above called beta. The desire is to have the angle beta approach zero or to have it as small as possible. It can be seen from FIGS. 4 and 5 that the angle is much smaller for the stylus in accordance with the present invention (FIG. 4) as compared with an elliptical stylus as shown in FIG. 5.

The angle beta is fixed by the two lines, where these lines connect to two points where in a modulated groove, the groove wall doesn't touch the extreme sides of the stylus but does in the direction of the stylus, wherein these two points opposite each other fix a certain line and, in the modulated groove, goes to the left and to the right, we can draw these two lines in the extreme situations. Where we connect these two extreme situations we fix the angle beta.

The longitudinal plane of the stylus is preferably brought in line with the hard plane of the diamond crystal which considerably increases the firmness of the stylus.

The sharp edged stylus has a very small mass. This permits reducing the tracking weight to less than one gram in some cases. The long narrow contact (FIG. 3) and the small angle beta makes possible undistorted and unmixed transmission of a very wide frequency range. Sound grooves already deformed by the use of round styli can be tracked normally with the described stylus because the contact areas are much longer (about 80% or more of the groove wall length as described above. The service life of the stylus in accordance with the present invention is quite long and up to about 8000 hours, which is about double that normally found in the prior art.

It should be noted that since the contact area of the stylus with the groove walls is 80% of the wall length or greater as previously described, permanent deformations made by prior use of circular styli will not materially affect reproduction because these permanent deformations will be below the level at which the stylus of the present invention tracks and will therefore never cause noise due to all deformation. For this reasons, records which ar essentially unplayable due to groove damage caused by use of poor styli can be played and provide satisfactory reproduction when utilized with the present stylus.

Figure 8:
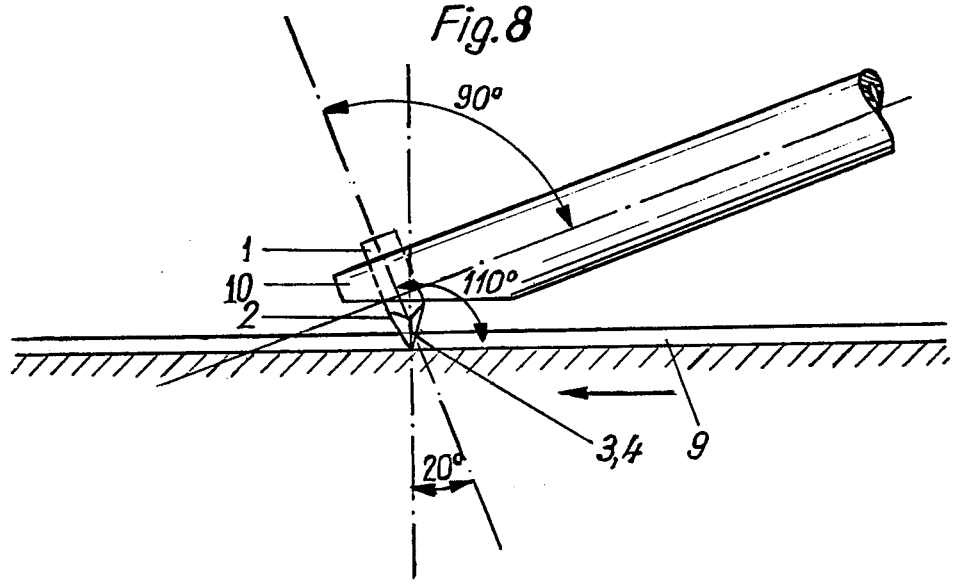
FIG. 8 the mounting of a stylus with an oblique taper, on a magnified scale.

The stylus of the first embodiment must be mounted at an angle of zero degrees to the vertical drawn through the end of the cantilever (FIG. 7). Therefore the cantilever must also be drilled at this angle and the stylus mounted on the cantilever at this angle, which represents considerable difficulties. The bending of the cantilever by 20° as shown in FIG. 7 or any other desired angle gives the cantilever less strength than a unit of straight material as shown in FIG. 8. Bending becomes very difficult if not almost impossible when materials such as boron or beryllium are used as the cantilever because of the hardness of the material. The alternative of drilling a hole for the stylus through the cantilver of 20° is also very difficult and economically unsound. A manner of resolving this problem is now shown in the embodiment of FIG. 8. It should be understood that the 20° angle of FIGS. 7 or 8 can be varied to suit record manufacturing.

The taper 2 of the stylus 1, 2 represented in FIG. 8 has an edge 3, 4 with a rounded tip 3 as previously described. The two ground sections 4 of the tracking edge run convex to each other. They are also symmetrical to each other but not to the longitudinal axis of the stylus 1, 2 as described in the first embodiment. The taper 2 is ground so that the plane passing through the tracking edge 3, 4 makes an angle of 20° with the longitudinal axis of the mounting part 1 of the stylus. With the longitudinal axis of the mounting part 1 of the stylus 1, 2 (FIG. 8) at right angles to the sound groove 9, the angle between the plane passing through the tracking edge 3, 4 and the longitudinal part of the sound groove 9 lying on the opposite side of the stylus 1, 2 is 100°. This angle corresponds to that of the conventional stylus mounting as shown in FIG. 7. The fact that the stylus 1, 2 as shown in FIG. 8 can be mounted at right angles at the end of the cantilever 10 lying parallel to the tangent of the sound groove 9 is an advantage. This arrangement permits simpler, more reliable drilling of the cantilever 10 as well as better mounting of the stylus 1, 2.

What is claimed is:

1. A method for forming a stylus for tracking the sound groove of a stereophonic or quadraphonic record, comprising the steps of:
   (a) providing a stylus having a longitudinal axis and having a mounting part and a taper,
   (b) forming a pair of convex curved continuous surfaces in said taper which intersect along a continuous arc disposed in both surfaces, said surfaces being dicontinuous relative to each other along the arc of intersection wherealong they form a sharp edge having a substantially constant angle of intersection and being symmetrical about a plane including said longitudinal axis and said arc, said axis passing through the midpoint on said arc where the arc is tangent to a plane normal to said axis, and
   (c) rounding said taper along said sharp edge in a direction normal to said arc with a radius of curvature in the range of 4 to 10 microns wherein, as the stylus tracks the record groove and the actual points that the stylus contacts the groove move around the stylus and define an angle $\beta$, this angle $\beta$ is maintained small.

2. The product of the process of claim 1.

3. A method as set forth in claim 1 wherein said stylus is a diamond.

4. A method as set forth in claim 1 wherein said continuous arc has a radius of curvature in the range of 80 to 100 microns.

5. The product of the process of claim 3.

6. The product of the process of claim 4.

* * * * *